US009628307B2

(12) United States Patent
Zaribafiyan et al.

(10) Patent No.: US 9,628,307 B2
(45) Date of Patent: Apr. 18, 2017

(54) METHOD AND SYSTEM FOR OPTIMIZING ASSET ALLOCATION IN A COGNITIVE RADIO CONFIGURATION

(71) Applicant: 1QB INFORMATION TECHNOLOGIES INC., Vancouver (CA)

(72) Inventors: Arman Zaribafiyan, Vancouver (CA); Jaspreet Oberoi, Coquitlam (CA)

(73) Assignee: 1QB INFORMATION TECHNOLOGIES INC., Vancouver (CA)

( * ) Notice: Subject to any disclaimer, the term of this patent is extended or adjusted under 35 U.S.C. 154(b) by 33 days.

(21) Appl. No.: 14/608,483

(22) Filed: Jan. 29, 2015

(65) Prior Publication Data

US 2015/0222460 A1   Aug. 6, 2015

Related U.S. Application Data

(60) Provisional application No. 61/934,049, filed on Jan. 31, 2014.

(51) Int. Cl.
*H04L 27/00* (2006.01)
*H04W 72/04* (2009.01)
*H04W 16/14* (2009.01)

(52) U.S. Cl.
CPC ........ *H04L 27/0006* (2013.01); *H04W 16/14* (2013.01)

(58) Field of Classification Search
CPC .................. H04W 16/14; H04L 27/0006
USPC .......................................... 370/329
See application file for complete search history.

(56) References Cited

U.S. PATENT DOCUMENTS

2013/0200948 A1* 8/2013 Lee ............... H03F 1/3247
330/10

OTHER PUBLICATIONS

McGeoch, Catherine C. et al., "Experimental Evaluation of an Adiabatic Quantum System for Combinatorial Optimization." Computing Frontiers. May 14-16, 2013 (http://www.cs.amherst.edu/ccm/cf14-mcgeoch.pdf).

* cited by examiner

*Primary Examiner* — Jung Park
*Assistant Examiner* — Albert Shih
(74) *Attorney, Agent, or Firm* — Pearl Cohen Zedek Latzer Baratz LLP

(57) ABSTRACT

A method and system are provided for optimizing asset allocation in a cognitive radio configuration, the method comprising obtaining, in a digital computer, an indication of the cognitive radio configuration; converting the indication of the cognitive radio configuration into a degree 2 polynomial; providing the degree 2 polynomial to a quadratic programming machine; solving the degree 2 polynomial using the quadratic programming machine to generate binary solutions; the digital computer receiving the generated binary solutions and generating an asset allocation for the cognitive radio configuration and providing the generated asset allocation for the cognitive radio configuration.

11 Claims, 7 Drawing Sheets

| $x$ | $y$ | $x \vee y$ | $x + y - xy$ |
|---|---|---|---|
| 0 | 0 | 0 | 0 |
| 0 | 1 | 1 | 1 |
| 1 | 0 | 1 | 1 |
| 1 | 1 | 1 | 1 |

Table 1: OR

| $x$ | $y$ | $x \wedge y$ | $xy$ |
|---|---|---|---|
| 0 | 0 | 0 | 0 |
| 0 | 1 | 0 | 0 |
| 1 | 0 | 0 | 0 |
| 1 | 1 | 1 | 1 |

Table 2: AND

| $x$ | $\neg x$ | $1-x$ |
|---|---|---|
| 0 | 1 | 1 |
| 1 | 0 | 0 |

Table 3: NOT

| $x$ | $y$ | $\neg(x \wedge y)$ | $1-xy$ |
|---|---|---|---|
| 0 | 0 | 1 | 1 |
| 0 | 1 | 1 | 1 |
| 1 | 0 | 1 | 1 |
| 1 | 1 | 0 | 0 |

Table 4: NAND

| $x$ | $y$ | $\neg(x \vee y)$ | $1-x-y+xy$ |
|---|---|---|---|
| 0 | 0 | 1 | 1 |
| 0 | 1 | 0 | 0 |
| 1 | 0 | 0 | 0 |
| 1 | 1 | 0 | 0 |

Table 5: NOR

| $x$ | $y$ | $x \oplus y$ | $x+y-2xy$ |
|---|---|---|---|
| 0 | 0 | 0 | 0 |
| 0 | 1 | 1 | 1 |
| 1 | 0 | 1 | 1 |
| 1 | 1 | 0 | 0 |

Table 6: XOR

| $x$ | $y$ | $\neg(x \oplus y)$ | $1-x-y+2xy$ |
|---|---|---|---|
| 0 | 0 | 1 | 1 |
| 0 | 1 | 0 | 0 |
| 1 | 0 | 0 | 0 |
| 1 | 1 | 1 | 1 |

Table 7: XNOR

FIG .4

METHOD AND SYSTEM FOR OPTIMIZING ASSET ALLOCATION IN A COGNITIVE RADIO CONFIGURATION

CROSS-REFERENCE TO RELATED APPLICATION

This application claims priority from U.S. Provisional Patent Application No. 61/934,049, entitled "Method and System for Optimizing Asset Allocation in a Cognitive Radio Configuration," filed on Jan. 31, 2014, the entire contents of which is incorporated herein by reference.

FIELD OF THE INVENTION

The invention relates to telecommunications. More precisely, the invention pertains to a method and system for optimizing asset allocation in a cognitive radio configuration.

BACKGROUND OF THE INVENTION

A base station is an installed wireless communications station which acts as a controller for a communication system. It will be appreciated that it acts as a service provider to the subscribers and the service can be any kind of data transmission. It will be appreciated that a base station can also be used as a repeater for improving a communication link.

Examples of base stations are, but are not limited to, a cellular mobile tower, a radio station tower, a data transmission satellite, etc. A base station can be a wireless signal transmitter or a transceiver.

A subscriber of the wireless data communication service is typically referred to as a user.

Examples of users are, but are not limited to, a cellular phone subscriber, a radio receiver, a satellite signal receiver station on earth or in space, etc. A user can be a wireless signal receiver or a transceiver.

As known to the skilled addressee, a cognitive radio is an intelligent radio that can be programmed and configured dynamically. Consequently, such radio changes its transmission or reception parameters in order to allow more concurrent wireless communication in a given spectrum band at a given location.

The Cognitive Radio System terminology states a receiver as the user and a transmitter as the base station (BS).

The frequency band over which the cognitive radio (CR) system is deployed is called a cognitive radio (CR) band.

A licensed user in the cognitive radio system is known as the primary user (PU) and a user trying to communicate opportunistically on the licensed frequency band of the primary user is called the secondary user (SU).

The skilled addressee will appreciate that the three kinds of participants involved in a cognitive radio system are the primary user(s), the secondary user(s) and the base station(s) that are not licensed to transmit in the cognitive radio band. The term 'base station' will be used in this document to refer to this second type of base station, the "cognitive radio." It is responsible for sensing the environment around it and adapting to it accordingly.

There are three major cognitive radio paradigms and they are known as underlay, interweave and overlay.

In the underlay technique, the cognitive radio transmits along with the licensed base station, and it is constrained to cause minimal interference to the primary user(s). Thus the cognitive radio does not have to wait for the licensed base station to stop its transmission to use its frequency band in underlay. Unfortunately, this technique is computationally complex and hard to implement optimally.

A simple example of an underlay cognitive radio system is shown in FIG. 1.

In the interweave paradigm, the cognitive radio finds and exploits spectral holes to transmit its own data. For example, it looks for the frequency bracket or the time frame where the licensed base station is not transmitting and then opportunistically transmits on that frequency or time to avoid interference.

The third paradigm, known as the overlay, is used for overhearing and enhancing the transmission of the licensed base station.

There is a need for a method for optimizing asset allocation in an "underlay" cognitive radio configuration.

Features of the invention will be apparent from review of the disclosure, drawings and description of the invention below.

BRIEF SUMMARY OF THE INVENTION

According to an aspect, there is disclosed a method for optimizing asset allocation in a cognitive radio configuration, the method comprising obtaining, in a digital computer, an indication of the cognitive radio configuration; converting the indication of the cognitive radio configuration into a degree 2 polynomial; providing the degree 2 polynomial to a quadratic programming machine; solving the degree 2 polynomial using the quadratic programming machine to generate binary solutions; the digital computer receiving the generated binary solutions and generating an asset allocation for the cognitive radio configuration and providing the generated asset allocation for the cognitive radio configuration.

According to another aspect, there is disclosed a method for optimizing asset allocation in a cognitive radio configuration of a cognitive radio network, the method comprising obtaining, in a digital computer, an indication of a cognitive radio configuration; converting the indication of the cognitive radio configuration into a degree 2 polynomial; providing the degree 2 polynomial to a quadratic programming machine; obtaining, in the digital computer, binary solutions of the degree 2 polynomial from the quadratic programming machine; generating an asset allocation for the cognitive radio configuration using the binary solutions and providing the generated asset allocation for the cognitive radio configuration.

According to an embodiment, the converting of the indication of the cognitive radio configuration into a degree 2 polynomial comprises providing an objective function; providing a plurality of constraints; converting the objective function into a polynomial function using the plurality of constraints and generating a degree 2 polynomial corresponding to the polynomial function.

According to an embodiment, the objective function is defined as min $C(x_{b,u}, z_b, P_{b,u})$ wherein $P_{b,u}$ represents a power used for transmission by base station b for user u, $x_{b,u}$ has a value indicative of a service provided by a base station b to a user u, and $z_b$ has a value indicative of a transmission for base station.

According to an embodiment, the plurality of constraints comprises essential constraints.

According to an embodiment, the obtaining, in a digital computer, of the indication of the cognitive radio configuration comprises the digital computer receiving the indication of the cognitive radio configuration from a user interacting with the digital computer.

According to an embodiment, the obtaining, in a digital computer, of the indication of the cognitive radio configuration comprises the digital computer receiving the indication of the cognitive radio configuration from a processing unit.

According to an embodiment, the processing unit is an element of a corresponding cognitive radio network.

According to an embodiment, the processing unit is located outside a corresponding cognitive radio network.

According to an embodiment, the providing of the generated asset allocation for the cognitive radio configuration comprises providing the generated asset allocation to a user interacting with a digital computer.

According to an embodiment, the providing of the generated asset allocation for the cognitive radio configuration comprises providing the generated asset allocation to the processing unit.

According to an embodiment, the providing of the degree 2 polynomial to a quadratic programming machine is performed using a token system over the Internet.

According to a broad aspect, there is disclosed a digital computer comprising a central processing unit; a display device; a communication port for operatively connecting the digital computer to a quadratic programming machine; a memory unit comprising an application for optimizing asset allocation in a cognitive radio configuration, the application comprising: instructions for obtaining an indication of a cognitive radio configuration; instructions for converting the indication of the cognitive radio configuration into a degree 2 polynomial; instructions for providing the degree 2 polynomial to the quadratic programming machine; instructions for obtaining binary solutions of the degree 2 polynomial from the quadratic programming machine; instructions for generating an asset allocation for the cognitive radio configuration using the binary solutions; instructions for providing the generated asset allocation for the cognitive radio configuration and a data bus for interconnecting the central processing unit, the display device, the communication port and the memory unit.

According to another broad aspect, there is disclosed a non-transitory computer-readable storage medium for storing computer-executable instructions which, when executed, cause a digital computer to perform a method for optimizing asset allocation in a cognitive radio configuration, the method comprising obtaining, in a digital computer, an indication of a cognitive radio configuration; converting the indication of the cognitive radio configuration into a degree 2 polynomial; providing the degree 2 polynomial to a quadratic programming machine; obtaining, in the digital computer, binary solutions of the degree 2 polynomial from the quadratic programming machine; generating an asset allocation for the cognitive radio configuration using the binary solutions and providing the generated asset allocation for the cognitive radio configuration.

An advantage of the method disclosed herein is that it helps to determine an optimal asset allocation for a cognitive radio configuration.

Another advantage of the method disclosed herein is that it improves substantially the operating of a processing unit used for determining an optimal asset allocation for a cognitive radio configuration.

BRIEF DESCRIPTION OF THE DRAWINGS

In order that the invention may be readily understood, embodiments of the invention are illustrated by way of example in the accompanying drawings.

FIG. 4 shows a plurality of truth tables.

Figure 1:
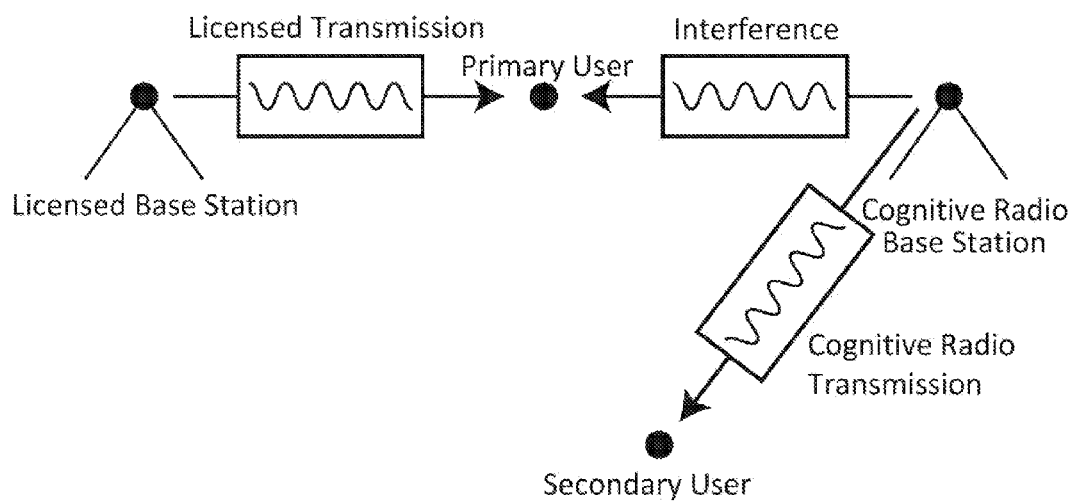
FIG. 1 is a diagram that shows an embodiment of an underlay cognitive radio system.

Further details of the invention and its advantages will be apparent from the detailed description included below.

DETAILED DESCRIPTION OF THE INVENTION

In the following description of the embodiments, references to the accompanying drawings are by way of illustration of an example by which the invention may be practiced.

Terms

The term "invention" and the like mean "the one or more inventions disclosed in this application," unless expressly specified otherwise.

The terms "an aspect," "an embodiment," "embodiment," "embodiments," "the embodiment," "the embodiments," "one or more embodiments," "some embodiments," "certain embodiments," "one embodiment," "another embodiment" and the like mean "one or more (but not all) embodiments of the disclosed invention(s)," unless expressly specified otherwise.

A reference to "another embodiment" or "another aspect" in describing an embodiment does not imply that the referenced embodiment is mutually exclusive with another embodiment (e.g., an embodiment described before the referenced embodiment), unless expressly specified otherwise.

The terms "including," "comprising" and variations thereof mean "including but not limited to," unless expressly specified otherwise.

The terms "a," "an" and "the" mean "one or more," unless expressly specified otherwise.

The term "plurality" means "two or more," unless expressly specified otherwise.

The term "herein" means "in the present application, including anything which may be incorporated by reference," unless expressly specified otherwise.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example," and thus does not limit the term or phrase it explains. For example, in a sentence "the computer sends data (e.g., instructions, a data structure) over the Internet," the term "e.g." explains that "instructions" are an example of "data" that the computer may send over the Internet, and also explains that "a data structure" is an example of "data" that the computer may send over the Internet. However, both "instructions" and "a data structure" are merely examples of "data," and other things besides "instructions" and "a data structure" can be "data."

The term "i.e." and like terms mean "that is," and thus limits the term or phrase it explains. For example, in the sentence "the computer sends data (i.e., instructions) over the Internet," the term "i.e." explains that "instructions" are the "data" that the computer sends over the Internet.

The terms "quadratic programming computer" or "quadratic programming machine" and like terms mean a system consisting of one or many types of hardware that solves a degree 2 optimization, whether quantum or classical, analog or digital. An example of which can be seen in: McGeoch, Catherine C. and Cong Wang. (2013), "Experimental Evaluation of an Adiabiatic Quantum System for Combinatorial Optimization" Computing Frontiers. May 14-16, 2013 (http://www.cs.amherst.edu/ccm/cf14-mcgeoch.pdf). It will be appreciated that the "quadratic programming computer" may also be comprised of "classical components," such as a classical computer. Accordingly, a "quadratic programming computer" may be entirely analog or an analog-classical hybrid.

Neither the Title nor the Abstract is to be taken as limiting in any way as the scope of the disclosed invention(s). The title of the present application and headings of sections provided in the present application are for convenience only, and are not to be taken as limiting the disclosure in any way.

Various embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural and logical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

It will be appreciated that the invention can be implemented in numerous ways, including as a method, a system and a computer-readable medium such as a computer-readable storage medium.

In this specification, these implementations, or any other form that the invention may take, may be referred to as systems or techniques. A component such as a processor or a memory described as being configured to perform a task includes both a general component that is temporarily configured to perform the task at a given time or a specific component that is manufactured to perform the task.

With all this in mind, the present invention is directed to a method, system, and computer program product for optimizing asset allocation in a cognitive radio configuration.

Figure 2:
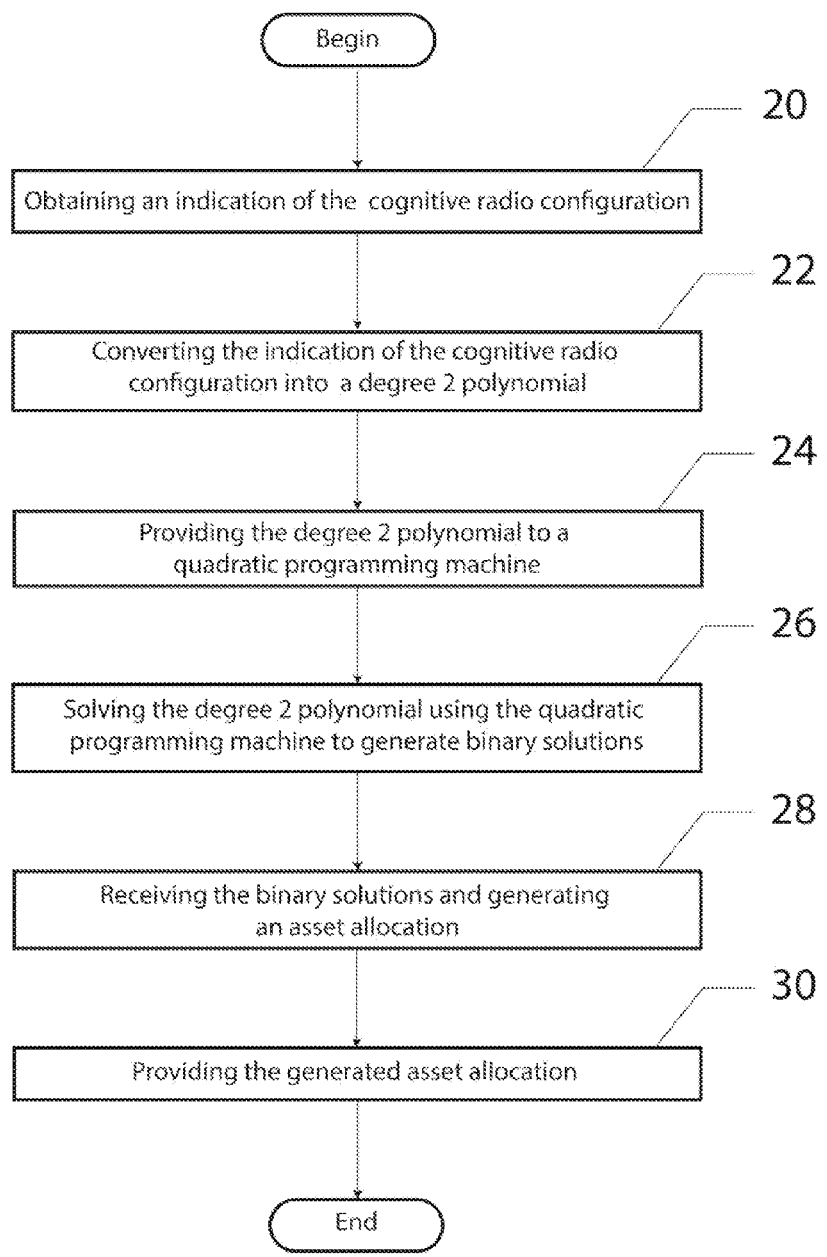
FIG. 2 is a flowchart that shows an embodiment of a method for optimizing asset allocation in a cognitive radio configuration.

Now referring to FIG. 2 and according to processing step 20, an indication of a cognitive radio configuration is obtained in a digital computer.

It will be appreciated that the obtaining of an indication of a cognitive radio configuration is achieved using a microprocessor of the digital computer in one embodiment.

In fact, it will be appreciated that the objective of a communication system is to ensure efficient and accurate data transmission. In one embodiment, this can be represented variably as maximizing the throughput, minimizing the bit error rate (BER), minimizing the cost, etc.

It will be therefore appreciated that an optimization problem, defined below, is solved in order to achieve the objective of the communication system for a specific cognitive radio configuration to be solved.

Accordingly, the indication of a cognitive radio configuration is therefore represented using an objective function defined according to the description of the specific cognitive radio configuration to be solved.

It will be appreciated that the indication of a cognitive radio configuration is obtained by the digital computer from a processing unit in one embodiment. In one embodiment, the processing unit is an element of the cognitive radio network, such as for instance a cognitive radio. In an alternative embodiment, the processing unit providing the indication of a cognitive radio configuration is located outside the cognitive radio network. In an alternative embodiment, the indication of a cognitive radio configuration is obtained from a user interacting with a processing unit. In a further embodiment, the indication of a cognitive radio configuration is obtained by the digital computer from a user interacting directly with the digital computer.

In the optimization problem definition, a base station is represented by b and the total number of available base stations is given by B. For users, a secondary user is represented by u, a primary user is represented by v with the total number being U and V respectively.

$P_{b,u}$ represents a power used for transmission by the base station b for a user u.

The optimization variables comprise $x_{b,u}$, $z_b$ and $P_{b,u}$ in in one embodiment.

More precisely, $x_{b,u}$ and $z_b$ are the decision variables.

It will be appreciated that $x_{b,u}$ is equal to one (1) when the base station b is serving the secondary user u and it is equal to zero (0) otherwise.

Similarly, $z_b$ is equal to one (1) when the base station b is turned on and is equal to zero (0) otherwise.

It will be appreciated by the skilled addressee that "turned on" means that the base station is transmitting with some non-zero (0) power. An "off" base station means that the base station is not transmitting.

It will be appreciated that the objective function is defined in this embodiment as $C(x_{b,u}, z_b, P_{b,u})$ and the optimization problem is Min $C(x_{b,u}, z_b, P_{b,u})$.

As mentioned above, the objective function $C(x_{b,u}, z_b, P_{b,u})$ is defined according to the description of the specific cognitive radio configuration to be solved.

For instance, a problem to solve may be to minimize the number of base stations to be used conditioned that every secondary user is at least served by one base station, while satisfying all the constraints of the underlay cognitive radio paradigm.

Assuming the power $P_{b,u}$ used for transmission by the base station b for user u to be a fixed constant, the objective function $C(x_{b,u}, z_b, P_{b,u})$ may be defined as Min $$a\sum_{b=1}^{B} z_b + b\sum_{u=1}^{U}(1 - V_{b=1}^{U} x_{b,u})$$

where, a and b are weighted constants.

In one embodiment, for instance, the total number of available base stations is equal to three (3). The total number of secondary users is equal to four (4). The total number of primary users is equal to one (1). The base station power is equal to ten (10) units. The maximum power allocation to a secondary user is equal to three (3) units and the interference limit allowed on the primary user is equal to fifteen (15) units.

According to processing step 22, the indication of a cognitive radio configuration is converted into a degree 2 polynomial.

It will be appreciated that the conversion of the indication of a cognitive radio configuration into a degree 2 polynomial is achieved using a microprocessor of the digital computer in one embodiment.

Figure 3:
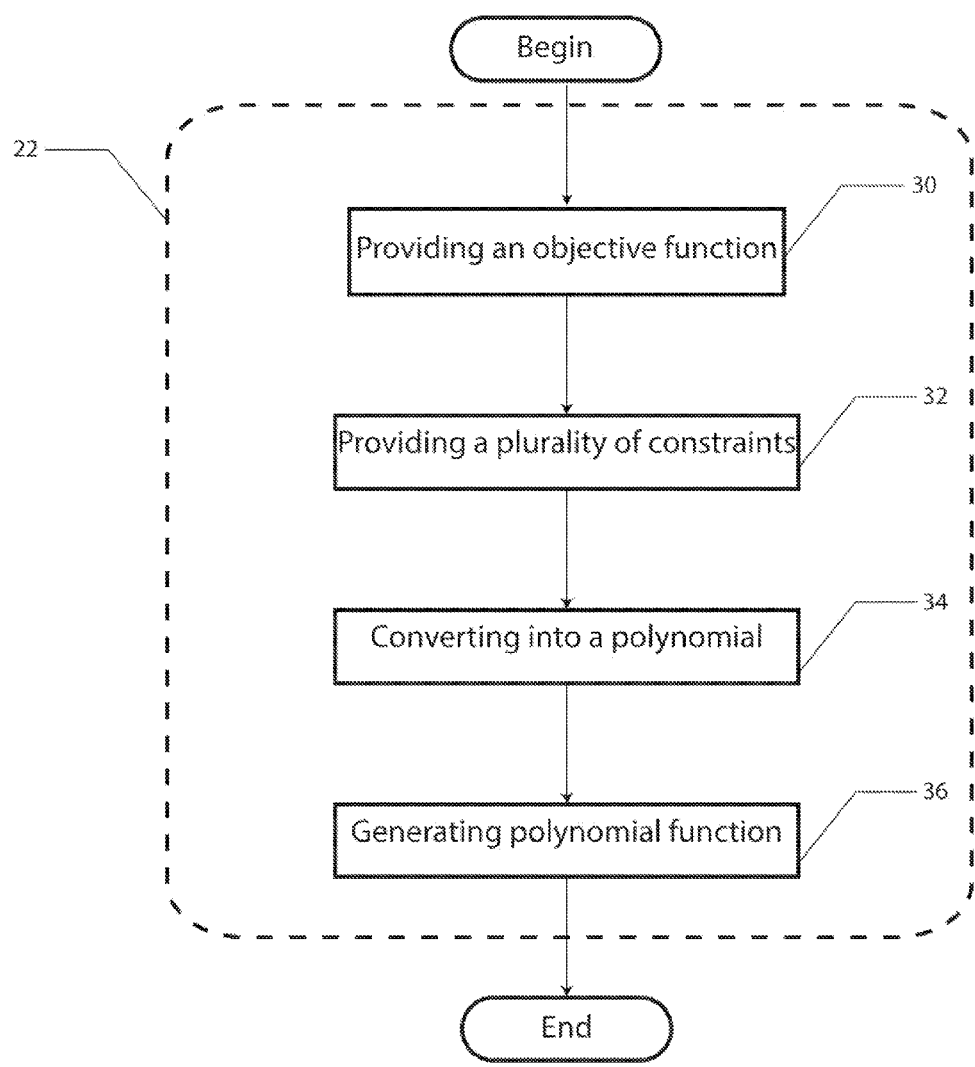
FIG. 3 is a flowchart that shows an embodiment for converting the indication of the cognitive radio configuration into a degree 2 polynomial.

Now referring to FIG. 3, there is shown an embodiment for performing such processing step.

According to processing step 30, the objective function is provided.

As mentioned above, the objective function is defined as $C(x_{b,u}, z_b, P_{b,u})$.

According to processing step 32, a plurality of constraints are provided.

It will be appreciated that another instance of the problem might have a selection of these constraints or additional constraints that will be treated in the same way. The provided constraints are the essential constraints for a valid cognitive radio problem. It will be appreciated that, in other problem instances, different constraints and cost functions may be used.

In fact, it will be further appreciated that there are a given number of constraints, defined as (a), (b), (c), (d), (e) and (f) and that are further detailed below.

Constraints:

$$x_{b,u} \in \{0, 1\}; \quad (a)$$

$$z_b \in \{0, 1\}; \quad (b)$$

$$z_b \leq \sum_{u=1}^{U} x_{b,u}, \forall b \in B; \quad (c)$$

$$z_b \geq x_{b,u}, \forall u \in U, \forall b \in B; \quad (d)$$

$$SINR(P_{b,u}) \geq \rho_u, \forall u \in U; \quad (e)$$

$$\sum_{u=1}^{U} P_{b,u} \leq P_b^{max}, \forall b \in B; \quad (f)$$

$$P_{b,u} \leq x_{b,u} \cdot P_b^{max}, \forall u \in U, \forall b \in B; \quad (g)$$

$$\sum_{b=1}^{B} \sum_{u=1}^{U} g_{b,v} \cdot P_{b,u} \leq I_v, \forall v \in V; \quad (h)$$

wherein $\rho_u$ is the SINR (Signal to Interference plus Noise Ratio) threshold value for user u, $P_b^{max}$ is the maximum output power capacity of the base station b, and $g_{b,v}$ is the channel gain between base station b and primary user v.

The interference threshold of a primary user v is represented by $I_v$, which states the maximum interference allowed on the primary user, v according to the underlay cognitive radio paradigm.

According to processing step 34, a conversion to a polynomial function is performed.

It will be appreciated that the optimization problem is NP-hard and thus finding an optimal solution for it is computationally costly and time-consuming. In order to solve the problem, a quadratic solver is used.

It will be appreciated that, in order to make this problem tractable and solvable by a quadratic solver, the constraints are incorporated in the objective function as penalties.

It will be further appreciated that the objective is to get a single polynomial function which represents the objective function and the standard constraints of the cognitive radio problem in totality.

In order to do so and in accordance with one embodiment, each constraint of the original problem is handled individually and a valid and satisfying penalty function is deduced for it. It will be appreciated that the penalty function is then added to the main objective function.

As illustrated below, the original problem is transformed into a quadratic solver-solvable problem.

It will be appreciated that constraints (a) and (b) limit the values that the decision variables can take to zero (0) and one (1), thus enforcing them to be binary variables.

It will be appreciated that constraint (c) states that, if a base station is turned on, it has to at least serve one secondary user. This ensures that an "on" base station is not wasted.

Constraint (d) states that in order to serve a secondary user, the base station has to be on; in other words, an off base station cannot serve any user(s).

It will be therefore appreciated that these two constraints may be incorporated by introducing $$\text{Penalty}(1) = C1^* \sum_{b=1}^{B} (z_b - V_{u=1}^{U} x_{b,u})^2,$$

where C1 is a weighted constant.

It will be appreciated that in this penalty a non-zero positive value is obtained when either one of the constraints (c) and (d) is violated.

For binary variables, the following relation $xVy \equiv x+y-xy$ is used to reduce $$V_{u=1}^{U} x_{b,u}$$

into a polynomial.

It is assumed for the purposes of an example problem, that $P_{b,u}$ is a fixed* constant for a base station b and all the secondary users it serves. This is a reasonable assumption considering the real-world applications, where dynamic power allocation has not been implemented on a large scale yet. This assumption eliminates the need for incorporating constraints (e) and (g). Other instances of a problem that this process solves will use other constants.

Constraint (f) sets an upper limit on the number of users that a particular base station can serve. By replacing '≤' with '=', we intend to extract the maximum out of the on base stations.

The Penalty(2) is added:

$$\sum_{b=1}^{B} \left\{ \left( \sum_{u=1}^{U} (P_{b,u} \cdot x_{b,u}) - P_b^{max} \cdot z_b \right)^2 \right\}$$

which can be written as, $$C2^* \sum_{b=1}^{B}\left\{\left(\sum_{u=1}^{U} x_{b,u} - M_b \cdot z_b\right)^2\right\}$$

where, $$M_b = \text{floor}\left(\frac{P_b^{max}}{P_{b,u}}\right)$$

and C2 is a weighted constant.

The operation floor(x) rounds off x to the lowest integer. Thus $M_b$ depicts the maximum number of secondary users that a base station b can serve.

It will be appreciated that the Penalty(2) results in a positive value whenever the number of secondary users being served by an "on" base station b is not equal to $M_b$ and returns zero penalty when an on base station serves exactly $M_b$ number of secondary users.

Constraint (h) defines a limit on the total interference allowed on the primary users. To include this constraint, Penalty(3):

$$C3^* \sum_{v=1}^{V}\left\{\left(\sum_{b=1}^{B}\left(g_{b,v} \cdot z_b \sum_{u=1}^{U} P_{b,u} \cdot x_{b,u}\right) - I_v \cdot V_{b=1}^{B} z_b\right)\right\}$$

is added with a weighted constant C3.

Including the original objective function and the deduced penalty functions, the polynomial: Min (C($x_{b,u}$, $z_b$, $P_{b,u}$)+Penalty(1)+Penalty(2)+Penalty(3)) is obtained.

The new objective function, which can be solved by a quadratic solver is thus represented as a minimization function:

$$\text{Min}\left\{C(x_{b,u}, z_b, P_{b,u}) + \right.$$

$$C1^* \sum_{b=1}^{B}\left(z_b - \bigvee_{u=1}^{U} x_{b,u}\right)^2 + C2^* \sum_{b=1}^{B}\left\{\left(\sum_{u=1}^{U} x_{b,u} - M_b \cdot z_b\right)^2\right\} +$$

$$\left. C3^* \sum_{v=1}^{V}\left\{\left(\sum_{b=1}^{B}\left(g_{b,v} \cdot z_b \sum_{u=1}^{U} P_{b,u} \cdot x_{b,u}\right) - I_v \cdot V_{b=1}^{B} z_b\right)\right\}\right\}.$$

According to processing step 36, a polynomial function is generated.

It will be appreciated that logical operations on binary variables are converted into polynomial functions.

In fact, a quadratic solver can only take a quadratic polynomial as an input. A package known as the Higher Order Logical Operations-to-Quadratic Unconstrained Binary Optimization (HOLO-2-QUBO) is therefore disclosed.

In order to generate the polynomial functions, all the logical operations namely OR, AND, NOT, NAND, NOR, XOR and XNOR are transformed.

Now referring to FIG. 4, there is shown for instance a polynomial equivalent of the OR operation, which is the relation xVy≡x+y≡xy.

The truth table corroborates the polynomial equation equivalence.

It will be appreciated that in FIG. 4, equivalent polynomials are established for the other logical operators and other corresponding truth tables are provided.

Using the equivalent polynomials, any combination of logical operations on any number of binary variables is transformed into an equivalent polynomial.

If the resulting polynomial is not quadratic but of higher degree than two, various higher order binary optimization to quadratic unconstrained binary optimization processes may be used to convert the higher order polynomial into a quadratic polynomial which then the quadratic solver is able to work with. This process of "HOBO to QUBO" reduces an optimization on a higher order polynomial to quadratic polynomials by introducing auxiliary variables.

Now referring back to FIG. 2 and according to processing step 24, the degree 2 polynomial is provided to a quadratic programming machine.

It will be appreciated that the providing of the degree 2 polynomial to the quadratic programming machine is achieved using a microprocessor in one embodiment. More precisely, the degree 2 polynomial is provided by the digital computer to the quadratic programming machine.

More precisely, it will be appreciated that in one embodiment, a token system is used over the Internet to provide access to the quadratic programming machine remotely and authenticate use.

According to processing step 26, the degree 2 polynomial is solved using the quadratic programming machine and binary solutions are generated.

It will be appreciated that the binary solutions are provided in a table by the quadratic programming machine in one embodiment.

According to processing step 28, the binary solutions are received and a corresponding asset allocation is generated. It will be appreciated that the corresponding asset allocation may be generated with the binary solutions using various criteria.

In one embodiment, the binary solutions are received by the digital computer. The corresponding asset allocation is generated by digital computer.

According to processing step 30, the generated asset allocation is provided.

It will be appreciated that the generated asset allocation may be provided according to various embodiments. In one embodiment, the generated asset allocation is provided to the user interacting with the digital computer.

Alternatively, the generated asset allocation is provided to a processing unit operatively connected to the digital computer.

Figure 7:
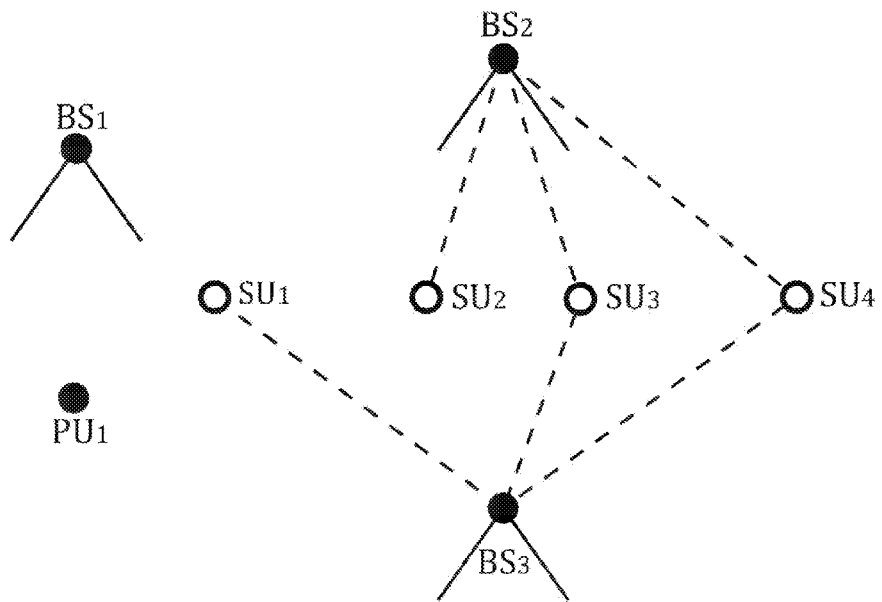
FIG. 7 is a diagram that shows a result from an optimized asset allocation in a cognitive radio configuration.

It will be appreciated that, for the example disclosed above, a resulting generated allocation is illustrated in FIG. 7.

In this embodiment, two out of the available three base stations are used to serve all the users. Base stations $BS_2$ and $BS_3$ are preferred over $BS_1$ as they individually produce less interference than $BS_1$. This comparison is based on the channel gains that the respective base stations $BS_S$ have with the $PU_1$. A single base station cannot serve all the four (4) users as it does not have the adequate power to do so. In this example, after serving three (3) users, a base station is left with just 10-3*3=1 unit of power, and the requirement to serve a user is of three (3) units. It can be observed that every user here is being served by at least one (1) base station and thus no user remains unserved. All the constraints are satisfied by the allocation generated.

Figure 5:
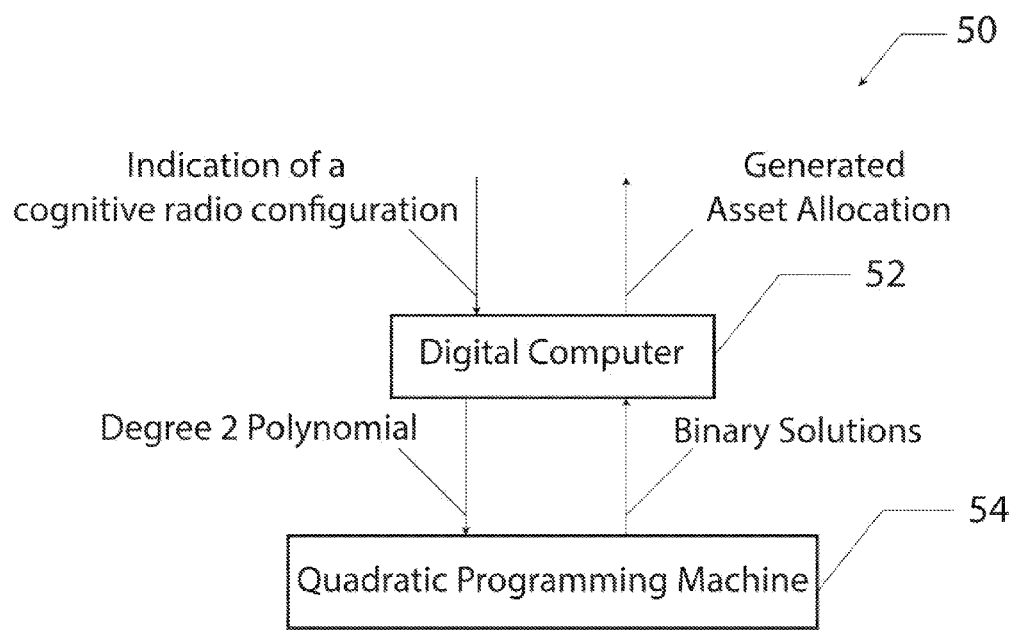
FIG. 5 is a diagram that shows an embodiment of a system for optimizing asset allocation in a cognitive radio configuration. The system comprises a digital computer and a quadratic programming machine.

Now referring to FIG. 5, there is shown an embodiment of a system 50 in which an embodiment of the method for optimizing asset allocation in a cognitive radio configuration may be implemented.

The system 50 comprises a digital computer 52 and a quadratic programming machine 54.

The digital computer 52 receives an indication of the cognitive radio configuration for which an asset allocation has to be generated.

It will be appreciated that the indication of the cognitive radio configuration may be provided according to various embodiments.

In one embodiment, the indication of the cognitive radio configuration may be provided by a user interacting with the digital computer 52.

Alternatively, the indication of the cognitive radio configuration may be provided by another processing unit operatively connected to the digital computer 52. Alternatively, the indication of the cognitive radio configuration may be provided by an independent software package. Alternatively, the indication of the cognitive radio configuration may be provided by an intelligent agent.

Similarly, it will be appreciated that the generated asset allocation may be provided according to various embodiments.

In accordance with an embodiment, the generated asset allocation may be provided to the user interacting with the digital computer 52.

Alternatively, the generated asset allocation may be provided to the processing unit operatively connected to the digital computer 52.

In fact, it will be appreciated by the skilled addressee that the digital computer 52 may be any type of computer.

In one embodiment, the digital computer 52 is selected from a group consisting of desktop computers, laptop computers, tablet PC's, servers, smartphones, etc.

Figure 6:
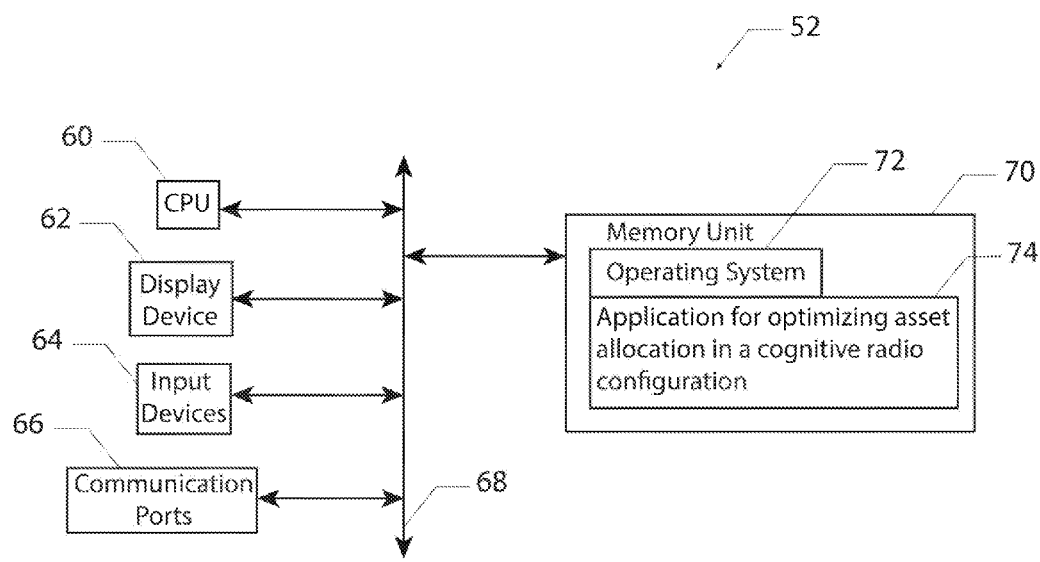
FIG. 6 is a diagram that shows an embodiment of a digital computer of the system for optimizing asset allocation in a cognitive radio configuration.

Now referring to FIG. 6, there is shown an embodiment of a digital computer 52.

In this embodiment, the digital computer 52 comprises a central processing unit (CPU) 60, also referred to as a microprocessor, a display device 62, input devices 64, communication ports 66, a data bus 68 and a memory unit 70.

The central processing unit 60 is used for processing computer instructions. The skilled addressee will appreciate that various embodiments of the central processing unit 60 may be provided.

In one embodiment, the central processing unit 60 is a CPU Core i73820 running at 3.6 GHz and manufactured by Intel™.

The display device 62 is used for displaying data to a user. The skilled addressee will appreciate that various types of display device 62 may be used.

In one embodiment, the display device 62 is a standard liquid-crystal display (LCD) monitor.

The input devices 64 are used for sharing data with the digital computer 52. The input devices 64 may comprise, for instance, a universal serial bus (USB) port for connecting a keyboard and a mouse to the digital computer 52.

The communication ports 66 are used for enabling a communication between the digital computer 52 and a remote processing unit.

The communication ports 66 may comprise a data network communication port, such as an IEEE 802.3 (Ethernet) port, for enabling a connection of the digital computer 52 with another computer via a data network.

The skilled addressee will appreciate that various alternative embodiments of the communication ports 66 may be provided.

The memory unit 70 is used for storing computer executable instructions.

It will be appreciated that the memory unit 70 comprises in one embodiment an operating system module 72.

It will be appreciated by the skilled addressee that the operating system module 72 may be of various types.

In an embodiment, the operating system module 72 is Windows™ 8 manufactured by Microsoft™.

The memory unit 70 further comprises an application for optimizing asset allocation in a cognitive radio configuration 74.

The application for optimizing asset allocation in a cognitive radio configuration 74 comprises instructions for obtaining an indication of a cognitive radio configuration.

The application for optimizing asset allocation in a cognitive radio configuration 74 further comprises instructions for converting the indication of the cognitive radio configuration into a degree 2 polynomial.

The application for optimizing asset allocation in a cognitive radio configuration 74 further comprises instructions for providing the degree 2 polynomial to the quadratic programming machine.

The application for optimizing asset allocation in a cognitive radio configuration 74 further comprises instructions for obtaining binary solutions of the degree 2 polynomial from the quadratic programming machine.

The application for optimizing asset allocation in a cognitive radio configuration 74 further comprises instructions for generating an asset allocation for the cognitive radio configuration using the binary solutions.

The application for optimizing asset allocation in a cognitive radio configuration 74 further comprises instructions for providing the generated asset allocation for the cognitive radio configuration.

Each of the CPU 60, the display device 62, the input devices 64, the communication ports 66 and the memory unit 70 is interconnected via the data bus 68.

Now referring back to FIG. 5, it will be appreciated that the digital computer 52 is operatively connected to the quadratic programming machine 54.

It will be appreciated that the coupling of the quadratic programming machine 54 to the digital computer 52 may be achieved according to various embodiments.

In one embodiment, the coupling of the quadratic programming machine 54 to the digital computer 52 is achieved via a data network.

The quadratic programming machine 54 may be of various types.

In one embodiment, the quadratic programming machine 54 is manufactured by DWave Systems Inc. The skilled addressee will appreciate that various alternative embodiments may be provided for the quadratic programming machine.

More precisely, the quadratic programming machine 54 receives a degree 2 polynomial from the digital computer 52.

The quadratic programming machine 54 is capable of solving the degree 2 polynomial with binary variables and providing corresponding binary solution solutions.

The corresponding binary solutions are provided by the quadratic programming machine 54 to the digital computer 52.

It will be appreciated that a non-transitory computer-readable storage medium is further disclosed. The non-transitory computer-readable storage medium is used for storing computer-executable instructions which, when executed, cause a digital computer to perform a method for optimizing asset allocation in a cognitive radio configuration. The method comprises obtaining, in a digital computer, an indication of a cognitive radio configuration; converting the indication of the cognitive radio configuration into a degree 2 polynomial; providing the degree 2 polynomial to a quadratic programming machine; obtaining, in the digital computer, binary solutions of the degree 2 polynomial from the quadratic programming machine; generating an asset allocation for the cognitive radio configuration using the binary solutions and providing the generated asset allocation for the cognitive radio configuration.

Although the above description relates to a specific preferred embodiment as presently contemplated by the inventor, it will be understood that the invention in its broad aspect includes functional equivalents of the elements described herein.

The invention claimed is:

1. A method for optimizing asset allocation in a cognitive radio configuration of a cognitive radio network, the method comprising:
obtaining, in a digital computer, an indication of the cognitive radio configuration, the indication of the cognitive radio configuration comprising an objective function defining the cognitive radio configuration, wherein the objective function is defined as min $(C(x_{b,u}, z_b, P_{b,u}))$, wherein $P_{b,u}$ represents a power used for transmission by base station b for user u and $x_{b,u}$, has a value indicative of a service provided by the base station b to the user u, and $z_b$ has a value indicative of a transmission for the base station b;
converting the indication of the cognitive radio configuration into a degree 2 polynomial by:
providing a plurality of constraints,
converting the objective function into a polynomial function using the plurality of constraints, and
generating the degree 2 polynomial corresponding to the polynomial function;
providing the degree 2 polynomial to a quadratic programming machine;
solving the degree 2 polynomial using the quadratic programming machine to generate binary solutions;
the digital computer receiving the generated binary solutions and generating an asset allocation for the cognitive radio configuration; and
providing the generated asset allocation for the cognitive radio configuration.

2. A method for optimizing asset allocation in a cognitive radio configuration of a cognitive radio network, the method comprising:
obtaining, in a digital computer, an indication of a cognitive radio configuration, the indication of the cognitive radio configuration comprising an objective function defining the cognitive radio configuration, wherein the objective function is defined as min $(C(x_{b,u}, z_b, P_{b,u}))$, wherein $P_{b,u}$ represents a power used for transmission by base station b for user u and $x_{b,u}$, has a value indicative of a service provided by the base station b to the user u, and $z_b$ has a value indicative of a transmission for the base station b;
converting the indication of the cognitive radio configuration into a degree 2 polynomial by:
providing a plurality of constraints,
converting the objective function into a polynomial function using the plurality of constraints, and
generating the degree 2 polynomial corresponding to the polynomial function;
providing the degree 2 polynomial to a quadratic programming machine;
obtaining, in the digital computer, binary solutions of the degree 2 polynomial from the quadratic programming machine;
generating an asset allocation for the cognitive radio configuration using the binary solutions; and
providing the generated asset allocation for the cognitive radio configuration.

3. The method as claimed in claim 2, wherein the obtaining, in a digital computer, of the indication of the cognitive radio configuration comprises the digital computer receiving the indication of the cognitive radio configuration from a user interacting with the digital computer.

4. The method as claimed in claim 2, wherein the obtaining, in a digital computer, of the indication of the cognitive radio configuration comprises the digital computer receiving the indication of the cognitive radio configuration from a processing unit.

5. The method as claimed in claim 4, wherein the processing unit is an element of a corresponding cognitive radio network.

6. The method as claimed in claim 4, wherein the processing unit is located outside a corresponding cognitive radio network.

7. The method as claimed in claim 2, wherein the providing of the generated asset allocation for the cognitive radio configuration comprises providing the generated asset allocation to a user interacting with a digital computer.

8. The method as claimed in claim 4, wherein the providing of the generated asset allocation for the cognitive radio configuration comprises providing the generated asset allocation to the processing unit.

9. The method as claimed in claim 2, wherein the providing of the degree 2 polynomial to a quadratic programming machine is performed using a token system over the Internet.

10. A digital computer comprising:
a central processing unit;
a display device;
a communication port for operatively connecting the digital computer to a quadratic programming machine;
a memory unit comprising an application for optimizing asset allocation in a cognitive radio configuration, the application comprising:
instructions for obtaining an indication of a cognitive radio configuration, the indication of the cognitive radio configuration comprising an objective function defining the cognitive radio configuration, wherein the objective function is defined as min $(C(x_{b,u}, z_b, P_{b,u}))$, wherein $P_{b,u}$ represents a power used for transmission by base station b for user u and $x_{b,u}$, has a value indicative of a service provided by the base station b to the user u, and $z_b$ has a value indicative of a transmission for the base station b;
instructions for converting the indication of the cognitive radio configuration into a degree 2 polynomial, including:
providing a plurality of constraints,
converting the objective function into a polynomial function using the plurality of constraints, and
generating the degree 2 polynomial corresponding to the polynomial function;
instructions for providing the degree 2 polynomial to the quadratic programming machine;

instructions for obtaining binary solutions of the degree 2 polynomial from the quadratic programming machine;

instructions for generating an asset allocation for the cognitive radio configuration using the binary solutions; and instructions for providing the generated asset allocation for the cognitive radio configuration; and a data bus for interconnecting the central processing unit, the display device, the communication port and the memory unit.

11. A non-transitory computer-readable storage medium for storing computer-executable instructions which, when executed, cause a digital computer to perform a method for optimizing asset allocation in a cognitive radio configuration, the method comprising:

obtaining, in a digital computer, an indication of a cognitive radio configuration, the indication of the cognitive radio configuration comprising an objective function defining the cognitive radio configuration, wherein the objective function is defined as min ($C(x_{b,u}$, $x_b$, $P_{b,u}$)) wherein $P_{b,u}$ represents a power used for transmission by base station b for user u and $x_{b,u}$ has a value indicative of a service provided by the base station b to the user u, and $z_b$ has a value indicative of a transmission for the base station b;

converting the indication of the cognitive radio configuration into a degree 2 polynomial by:
providing a plurality of constraints,
converting the objective function into a polynomial function using the plurality of constraints, and
generating the degree 2 polynomial corresponding to the polynomial function;

providing the degree 2 polynomial to a quadratic programming machine;

obtaining, in the digital computer, binary solutions of the degree 2 polynomial from the quadratic programming machine;

generating an asset allocation for the cognitive radio configuration using the binary solutions; and providing the generated asset allocation for the cognitive radio configuration.

* * * * *